United States Patent
Chakraborty et al.

(10) Patent No.: US 9,639,762 B2
(45) Date of Patent: May 2, 2017

(54) REAL TIME VIDEO SUMMARIZATION

(71) Applicant: Intel Corporation, Santa Clara, CA (US)

(72) Inventors: Shayok Chakraborty, Hillsboro, OR (US); Omesh Tickoo, Portland, OR (US); Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 14/477,595

(22) Filed: Sep. 4, 2014

(65) Prior Publication Data

US 2016/0070963 A1    Mar. 10, 2016

(51) Int. Cl.
*G06K 9/00* (2006.01)
*G11B 20/10* (2006.01)
*G11B 27/30* (2006.01)
*G06K 9/62* (2006.01)

(52) U.S. Cl.
CPC ....... *G06K 9/00751* (2013.01); *G06K 9/6271* (2013.01); *G11B 20/10527* (2013.01); *G11B 27/30* (2013.01); *G06K 2209/27* (2013.01); *G11B 2020/10537* (2013.01)

(58) Field of Classification Search
CPC .......... G06K 9/00751; G06K 2209/27; G06K 9/00718; G06K 9/6201; G11B 2020/10537; G11B 20/10527; G11B 27/30; H04N 19/192; H04N 19/31; H04N 19/40
USPC ....................................................... 386/241
See application file for complete search history.

(56) References Cited

U.S. PATENT DOCUMENTS

| | | | | |
|---|---|---|---|---|
| 2003/0210886 A1* | 11/2003 | Li | ............... | G06F 17/30793 386/241 |
| 2007/0245242 A1* | 10/2007 | Yagnik | ............... | G06F 17/30787 715/721 |
| 2009/0080853 A1 | 3/2009 | Chen et al. | | |
| 2012/0027371 A1* | 2/2012 | Hackett | ............... | G06F 17/30784 386/223 |

(Continued)

OTHER PUBLICATIONS

International Search Report and Written Opinion for International Patent Application No. PCT/US2015/043367, mailed on Nov. 11, 2015.

(Continued)

*Primary Examiner* — Behrooz Senfi
(74) *Attorney, Agent, or Firm* — Green, Howard & Mughal LLP

(57) ABSTRACT

System, apparatus, method, and computer readable media for on-the-fly captured video summarization. A video stream is incrementally summarized in concurrence with generation of the stream by a camera module. Saliency of the video stream summary is maintained as the stream evolves by updating the summary to include only the most significant frames. In one exemplary embodiment, saliency is determined by optimizing an objective function including terms that are indicative of both the diversity of a selection, and how representative the selection is to the processed portion of the video data corpus. A device platform including a CM and comporting with the exemplary architecture may provide video camera functionality at ultra-low power, and/or with ultra-low storage resources, and/or with ultra-low communication channel bandwidth.

22 Claims, 12 Drawing Sheets

(56) References Cited

U.S. PATENT DOCUMENTS

| | | |
|---|---|---|
| 2013/0293776 A1 | 11/2013 | Shih-Fu et al. |
| 2013/0336590 A1* | 12/2013 | Sentinelli ............... H04N 5/772 382/218 |
| 2014/0161351 A1* | 6/2014 | Yagnik .............. G06F 17/30787 382/171 |
| 2014/0211987 A1 | 7/2014 | Fan et al. |
| 2014/0225924 A1 | 8/2014 | Loxam et al. |
| 2014/0245463 A1* | 8/2014 | Suryanarayanan ..... G06F 21/10 726/28 |

OTHER PUBLICATIONS

Basak, et al., "Video Summarization with Supervised Learning", International Conference on Pattern Recognition (ICPR), 2008, 4 pages. (Only Abstract).

Boreczky, et al., "Comparison of Video Shot Boundary Detection Techniques", Journal of Electronic Imaging, vol. 5 (2), Apr. 1996, 7 pages.

Cooharojananone, et al., "Real Time Trajectory Search in Video Summarization using Direct Distance Transform", ICSP2010 Proceeding, IEEE, 2010, pp. 932-935.

Dalal, et al., "Histograms of Oriented Gradients for Human Detection", 2005, 8 pages.

Shroff, et al., "Video Précis: Highlighting Diverse Aspects of Videos", IEEE Transactions on Multimedia, vol. 12, No. 8, Dec. 2010, pp. 853-868.

Taskiran, et al., "Automated Video Summarization Using Speech Transcripts", IEEE Transactions on Multimedia, 2006, 12 pages.

Tseng, et al., "Personalized Video Summary Using Visual Semantic Annotations and Automatic Speech Transcriptions", IEEE Workshop on Multimedia Signal Processing, 2002, 5-8 pages. (Only Abstract).

Tseng, et al., "Video Summarization and Personalization for Pervasive Mobile Devices", SPIE Proceedings, 2001, 5 pages.

* cited by examiner

REAL TIME VIDEO SUMMARIZATION

BACKGROUND

A digital camera is a component often included in commercial electronic media device platforms. Digital cameras are now available in wearable form factors (e.g., video capture earpieces, video capture headsets, video capture eyeglasses, etc.), as well as embedded within smartphones, tablet computers, and notebook computers, etc.

The introduction of streaming video from mobile digital cameras has ushered in an era having an unprecedented volume of video data. Consider an application where the user wears a pair of glasses fitted with a video camera. The camera captures video streams depicting the activities of the user throughout the day. The user may be interested in viewing a synopsis of the main events of a particular day. However, manual analysis of such large amounts of data is intractable and automated data processing techniques have not kept pace with the need.

For example, automated video summarization algorithms that attempt to abstract the main occurrences and provide a succinct representation of a captured video typically require access to an entire pre-recorded video file and generate a summary of this static atomic unit. Such a technique however relies on large processing/storage resources to first encode, archive, and decode the entire stream duration originally captured at potentially high frame rates (e.g., 25 frames/second, or more). If such processing/storage resources are not present natively within the video recording platform, which may become the default for ultra-low power platforms (e.g., headsets, and other wearable forms), an entire video stream needs to be transferred from a camera platform to a backend machine (e.g., cloud server) for processing. Such a transfer however entails a heavy load on communication channels and is impractical for many device platforms and use cases.

Video recording platform architectures and techniques capable of automatically summarizing video in real-time (on-the-fly) as a video stream arrives progressively over time from camera module hardware present on the platform are therefore advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
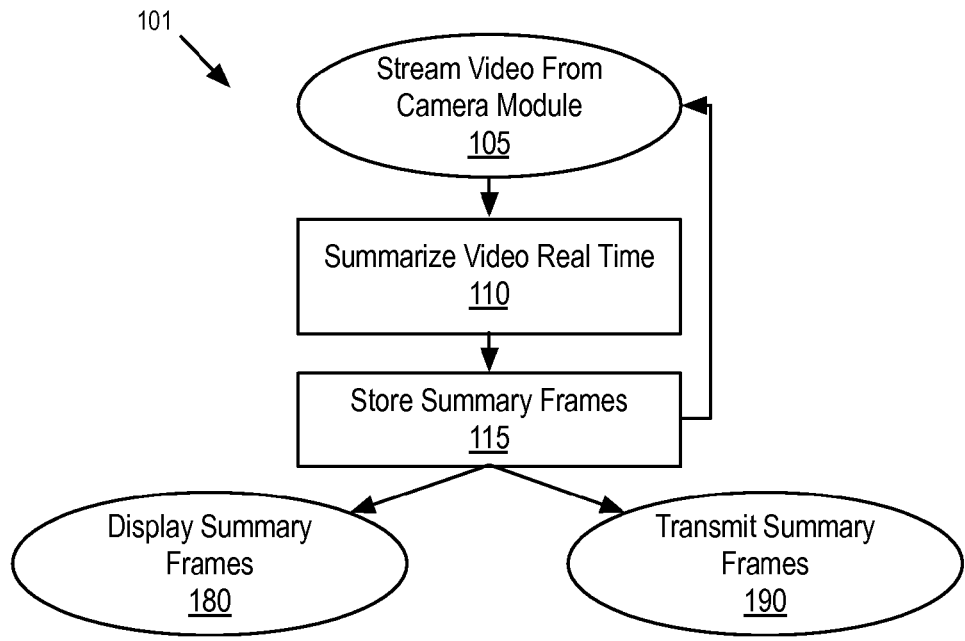
FIG. 1A is a flow diagram illustrating a real time (RT) captured video summarization method, in accordance with one or more embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for real-time captured video summarization. In "real-time" captured video summarization," a video stream is incrementally summarized in concurrence with generation of the stream. The summarization algorithm is operable without access to an entire video at any given time, instead observing it in segments sequentially over a period of time. Indeed in one exemplary embodiment where analyzed portions of a video corpus are discarded/overwritten by newly collected portions, frames included in a summary may have no analog within the surviving portion of the video corpus. As described further below, frames newly received from a CM and frames previously assessed are candidate summary frames iteratively evaluated for saliency as the data stream is received. Saliency of the stream summary is maintained as the stream evolves by updating the summary to include only the most significant frames. In one exemplary embodiment, saliency is determined by optimizing an objective function including terms that are indicative of both the diversity of a selection, and how representative the selection is to the processed portion of the video data corpus.

Multiple iterations of a summarization algorithm are to be executed in a time window spanning a CM's output of a first video frame to a last frame of a given series of consecutively captured frames comprising a continuous video stream. Rate requirements for real-time summarization are therefore a function of a frame rate associated with a camera hardware module (CM). As described below, a device platform including a CM and comporting with the exemplary architecture may provide video camera functionality at ultra-low power, and/or with ultra-low storage resources, and/or with ultra-low communication channel bandwidth. As also described below, a device platform including a CM and comporting with the exemplary architecture may enhance a user's video camera experience even where processing power, and/or storage, and/or communication resources are not at a particular premium.

FIG. 1A is a flow diagram illustrating a RT captured video summarization method 101, in accordance with one or more embodiment. Method 101 begins at operation 105 where a CM streams consecutively exposed video data frames at a frame rate (e.g., 30, 60, 120, 240, 480 fps, etc.). At operation 110, as the stream is received by hardware on the platform downstream of the CM, a subset of the received frames are selected as summary images representative of the video stream. At operation 115, selected summary frames are stored to a memory on the platform hosting the CM. This process continues with operations 105, 110 and 115 repeated periodically or in response to receiving a new set of frames including some predetermined number of video data frames. In exemplary embodiments, method 101 loops as hours of video data is streamed from the CM. Depending on the application, hours of streaming may be summarized by a selected subset of frames ranging from a few tens of frames (e.g., 20) to many hundreds of summary frames. As one example, a 20 summary frames may be selected as representative of 1,000,000 or more video data frames streamed over a day on a platform including a CM operating at 30 fps. A circular buffer retaining streamed video data may be relatively small, much less than would be required to store all the day's streamed video data frames, as it may be continuously overwritten in sole reliance of the stored summary images.

As further illustrated, the platform hosting the CM may also display a representation of the stored stream summary (e.g., a set of image files) at operation 180. Alternatively, or additionally, at operation 190 the platform hosting the CM may further transmit a representation of the stored stream summary (e.g., a set of image files) to a remote destination (e.g., a cloud server). For exemplary embodiments in accordance with method 101 therefore, exposed video data frames received from the CM that are not selected as summary frames (e.g., 1,000,000 or more video data frames) are discarded (e.g., overwritten by newer streamed video frames in a circular buffer implementation), reducing platform storage and/or transmission channel resource requirements by three or four orders of magnitude. For further embodiments, where the summarization operation 115 is upstream of a video stream encoding process, encoding engine resources and/or power is also reduced. With adequate quality of the automated stream summary, a handful of image frames resulting from a day's continuous recording may serves as a valuable visual catalogue of the day's events.

Figure 1B:
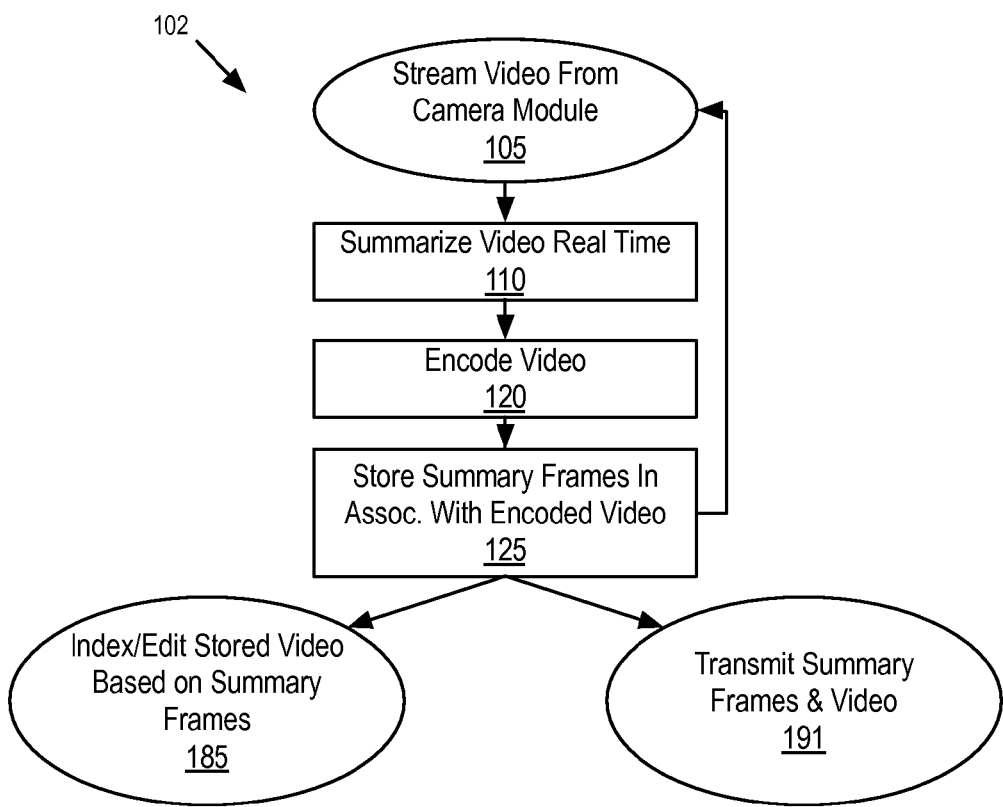
FIG. 1B is a flow diagram illustrating a RT captured video summarization method, in accordance with one or more embodiment.

FIG. 1B is a flow diagram illustrating a RT captured video summarization method 102, in accordance with one or more embodiment. Method 102 includes the video streaming operation 105 and real time stream summarization operation 110 as described above. Method 102 further includes however a video encoding and storing operation 120 where any known A/V codec (e.g., MPEG-4, H.264 AVC, etc.) is implemented. The resulting compressed representation of the video stream is stored to a memory and/or communicated of the platform hosting the CM. At operation 125, the summary frames selected at operation 110 are further stored in association with the stored video. The platform hosting the CM may further utilize a representation of the stored stream summary (e.g., a set of image files) at operation 185 as a set of thumbnails indicative of the stored video representation. In further embodiments, the stored stream summary is utilized by the CM platform to enable a user to index through, and/or otherwise gain access to the stored video corpus at the various entry points corresponding the summary frames. Alternatively, or additionally, at operation 191 the platform hosting the CM may further transmit the recorded video representation along with a representation of the stored stream summary (e.g., a set of image files) to a remote destination (e.g., a cloud server) where the stream summary may be similarly utilized as a thumbnail and/or index of entry points in the associated stored video. For exemplary embodiments in accordance with method 102, exposed video data frames received from the CM that are not selected as summary frames are therefore retained. Rather than reducing platform storage and/or transmission channel resource requirements, the real-time stream summarization method 102 utilizes the same automated summarization techniques leveraged in method 101 to enhance user experience beyond that of a conventional video streaming platform.

Figure 2A:
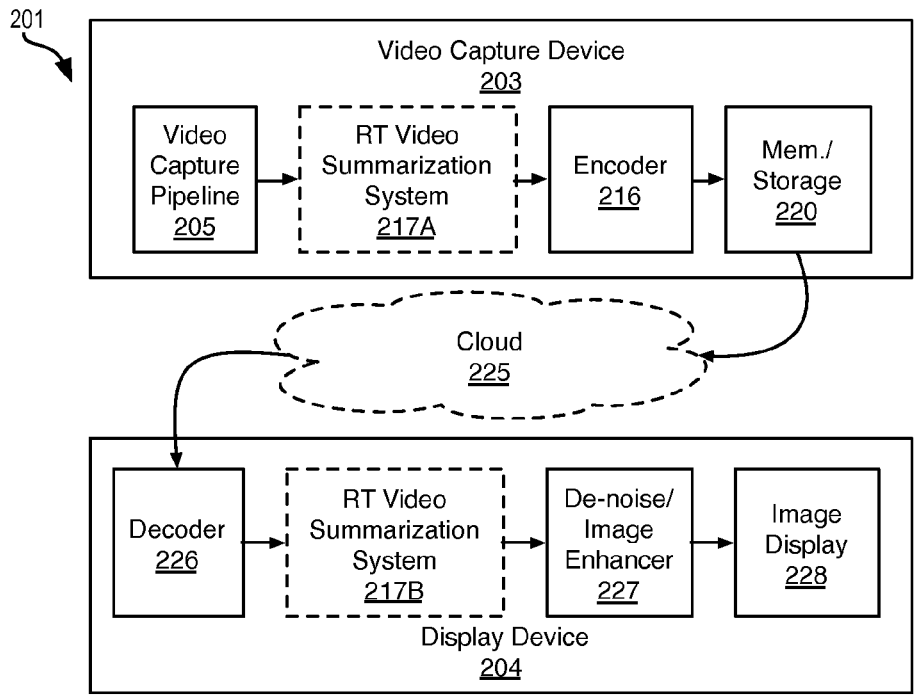
FIG. 2A is a functional block diagram of a system including a RT video data stream capture and summarization platform, in accordance with embodiments.

FIG. 2A is a functional block diagram of a system 201 including a video data stream capture device 203 and a display device 204, and at least one of device 203, 204 include a RT video summarization system, in accordance with embodiments. Functional blocks representing alternate embodiments of the RT video summarization system are illustrated in dashed line. System 201 may for example perform either of the methods 101, 102 described above. In a first embodiment, device platform 203 includes RT video summarization system 217A between a video capture pipeline 205 and a video encoder 216. Video capture pipeline 205 has an output coupled to an input of a RT video summarization system 217A. An output of RT video summarization system 217A is coupled to an input of an encoder 216. An output of encoder 216 is coupled to an input of memory (storage) 220. An encoded representation of summary frames output from memory 220 is coupled over a wired or wireless communication channel to a display device 204, which in the exemplary embodiment is coupled to video capture device 203 through a backend server in cloud 225. In alternate embodiments where cloud 225 is absent, with a display device 204 directly coupled to video capture device 203 over a local wired or wireless communication channel. In still other embodiments, display device 204 is integrated into video capture and summarization device 203 (i.e., both devices are part of the same platform). Decoder 226 receives an encoded frame summary from summary storage 220. In the first embodiment including RT video summarization system 217A, output from decoder 226 passes through downstream image enhancement processing, such as de-noise/image enhancer 227, and on to image display pipeline 228 where one or more of the summary frames are presented on a display screen. In a second embodiment further illustrated in FIG. 2A, the RT video summarization is implemented downstream of video encoder 216, for example as RT video summarization system 217B. For such an embodiment, a video stream output from video capture pipeline 205 is output to encoder 216 and the encoded stream representation is stored in memory 220. The encoded video stream is then decoded at decoder 226 and RT video summarization system 271B outputs summary frames that then pass through downstream image enhancement processing, such as de-noise/image enhancer 227, and through image display pipeline 228 where one or more of the summary frames are presented on a display screen.

Figure 2B:
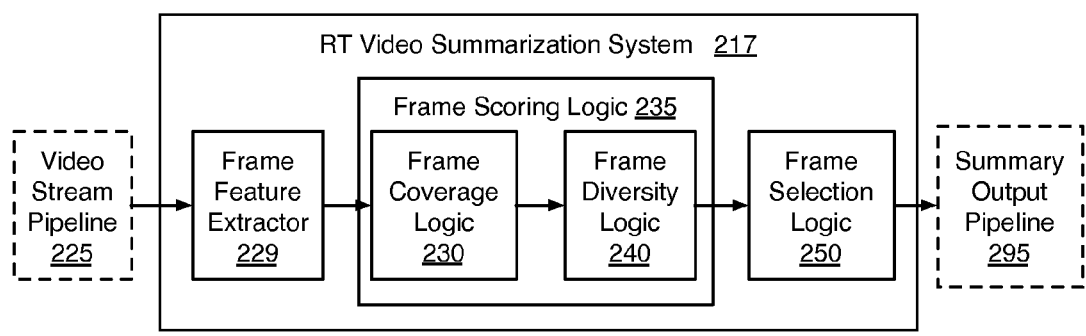
FIG. 2B is a functional block diagram of a RT video data stream summarization system, in accordance with one or more embodiment.

FIG. 2B is a functional block diagram of a RT video data stream summarization system 217, in accordance with one or more embodiment. System 217 may be implemented as either RT video summarization system 217A, or 217B in FIG. 2A, for example. System 217 has an input coupled to an output of a streaming video pipeline 225. Video pipeline 225 may have any known configuration. In one exemplary embodiment, video pipeline 225 includes a CM outputting video frames captured by an image sensor. Video data frames are received into a frame feature extractor 229 that is to extract one or more feature vector from each received frame. As described further below, the feature vector may include features determined using any object detection technique known in the art. In the exemplary embodiment, frame feature extractor 229 is to generate a feature vector comprising histograms of oriented gradient (HOG) features. Scoring logic 235 is coupled to an output of feature extractor 229 and is to score frames based on the feature vectors. Scoring logic 235 is to score each frame in a new set of frames received against, or with respect to, the other frames in the new set. In a further embodiment, scoring logic 235 is to score each frame in a new set of frames received further with respect to each frame that has previously been selected as a summary frame. Frame scoring logic 235 may generate scores based on one or more predetermined saliency criteria, as described further below. Frame selection logic 250 coupled to frame scoring logic 230 is to select a set of summary frames based on a solution to an objective (cost) function that optimizes the frame scoring for the selection. The inventors have found that this optimization-based strategy for online video summarization, in contrast to solutions that are purely heuristic, may be advantageously based on a concrete mathematical formulation and is not critically dependent on empirical parameter/threshold values.

In the exemplary embodiment illustrated in FIG. 2B, frame-scoring logic 235 includes both coverage scoring logic 230 and diversity scoring logic 240. Coverage scoring logic 230 is to compute coverage scores based on frame feature vectors. A coverage score is a metric quantifying how well a given frame represents other frames to which it is compared. Diversity scoring logic 240 is to compute diversity scores based on the frame feature vectors. A diversity score is a metric quantifying how distinct a frame is from other frames to which it is compared. Selection logic 250 is then to solve an objective function that is dependent on both coverage and diversity scores with the solution representing, for example, the set of frames with maximum coverage and maximum diversity. As such, the selected summary should "cover" most of the video while also including the most distinct elements. In alternate embodiments, one or more of coverage scoring logic 230 and diversity scoring logic 240 may be further combined with additional scoring logic circuitry. Selection logic 250 is then to solve an alternate objective function, for example following the rationale further described below in the context of the exemplary embodiment.

Figure 3:
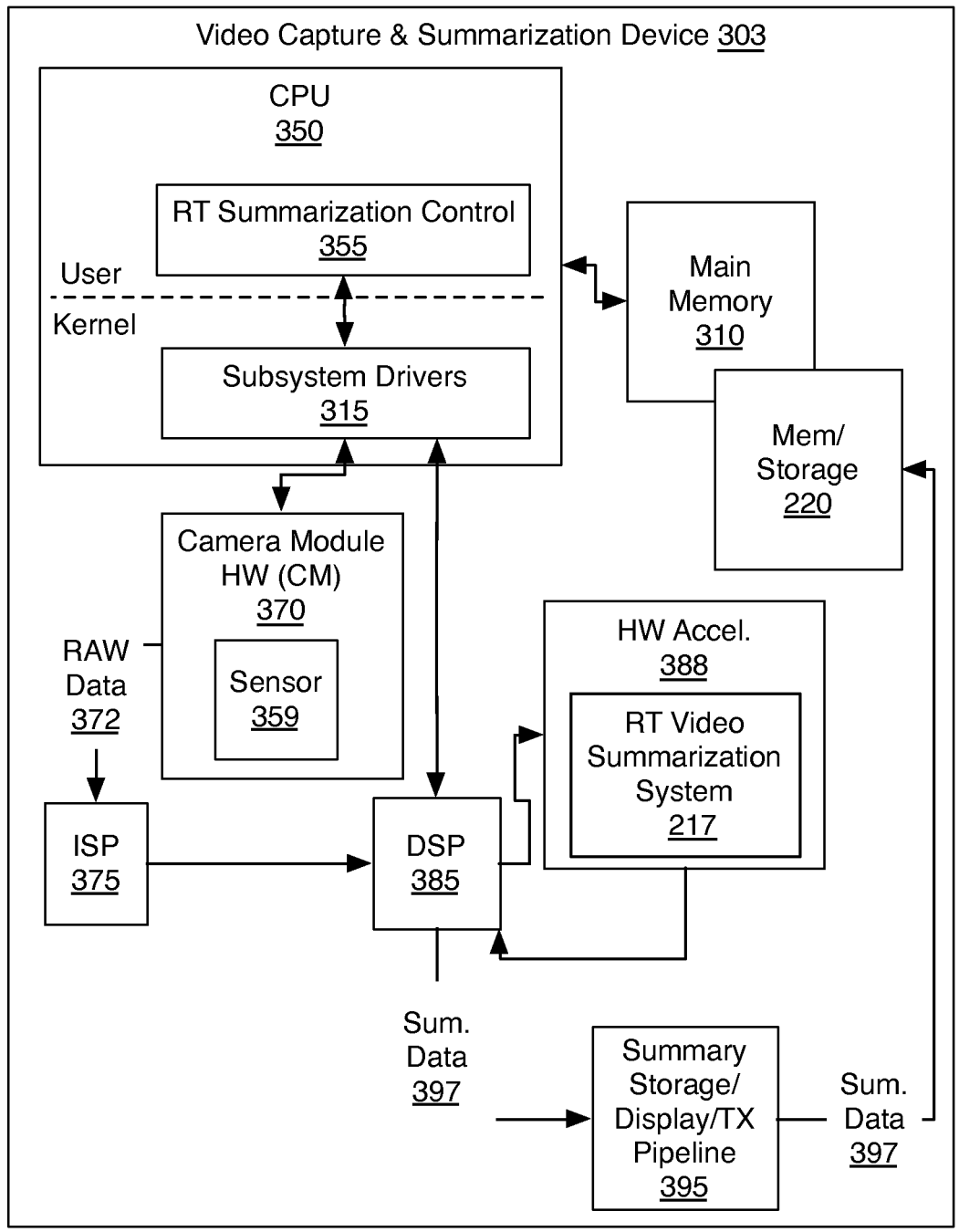
FIG. 3 illustrates a RT video data stream capture and summarization platform, in accordance with one or more embodiment.

FIG. 3 illustrates a RT video data stream capture and summarization device platform 303, in accordance with one exemplary embodiment. FIG. 3 further illustrates how a RT video stream summarization system, such as that introduced in FIG. 2C, may be integrated with various other components of a device platform to provide video camera summarization suitable for both high frame exposure rates and minimal storage/transmission resources.

Platform 303 includes CM 370. In the exemplary embodiment, CM 370 further includes a camera sensor 359. Sensor 359 may be a QXGA, WQXGA, or QSXGA-format digital image device, for example. Camera sensor 359 may provide a color resolution of 10 bits, or more per pixel, is operable to capture continuous video frames progressively. Sensor 359 may have a pixel frequency of 170 MHz, or more. Camera sensor 359 may include an RGB Bayer color filter, an analog amplifier, an A/D converter, other components to convert incident light into a digital signal corresponding to raw image data. Sensor 359 may be controlled to operate a rolling shutter or electronic focal plane shutter process where pixels are read out progressively in a line-sequential fashion for a frame. In exemplary video embodiments, sensor 350 outputs multiple consecutively exposed frames. CM 370 outputs at raw video data 372 associated with the consecutively exposed frames in conformance with any known streaming protocol, such as a MIPI or other protocol. Streamed raw video data 472 is input to ISP 375. ISP 375 is to receive and analyze frames of raw video data 372 during the horizontal and/or vertical blanking periods associated with CM 370. During raw image data processing, ISP 375 may perform one or more of noise reduction, pixel linearization, and shading compensation, for example.

Figure 6A:
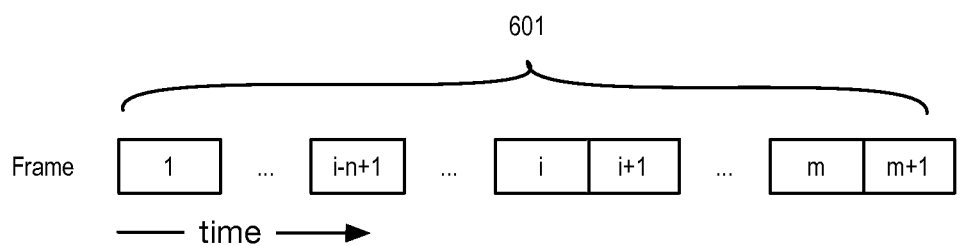
FIG. 6A illustrates consecutively exposed frames in a video stream, in accordance with one or more embodiment.
Figure 6B:
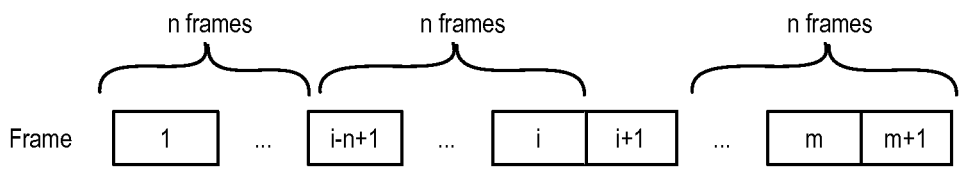
FIGS. 6B and 6C illustrate sets of frames segmented from the video stream depicted in FIG. 6A, in accordance with an embodiment.
Figure 6C:
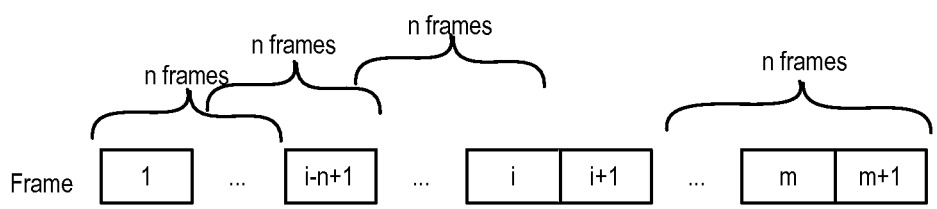

Processed video data may be buffered in a FIFO manner, for example with a circular buffer. DSP 385 is to fetch sets (segments) of consecutively exposed frames received into the buffer from CM 370 before new frames output by CM 370 overwrite them. FIG. 6A illustrates consecutively exposed frames in a video stream 601, in accordance with one or more embodiment. FIGS. 6B and 6C illustrate sets of frames generated from the video stream depicted in FIG. 6A, in accordance with an embodiment. In a first embodiment, illustrated by FIG. 6B, temporally adjacent sets are non-overlapping with each set including n frames that are exclusive of any frames included in other sets. In a second embodiment, illustrated by FIG. 6C, temporally adjacent sets are overlapping with each set including n−1 frames that are inclusive of frames included in another set. For the first embodiment, the stream summarization process will be iterated once for every n frames exposed by a CM. For the second embodiment, the stream summarization process will be iterated once for every frame exposed by the CM. Depending on the summarization technique employed and the resources implementing the technique, the amount of frame redundancy between adjacent sets may be varied between the two embodiments illustrated in FIGS. 6B and 6C. In exemplary RT video stream summarization method described further below, adjacent sets are non-overlapping (e.g., FIG. 6B).

Segmentation of the streaming video is useful for providing some scene consistency with respect to objects in each set of frames to be analyzed by the video summarization system. In exemplary embodiments, the number of frames included in each segment is static and predetermined, with all sets of frames including n consecutive frames. The number of consecutive frames in each set may be controlled through subsystem drivers 315 within a kernel space of an operating system (OS) instantiated by a central processing unit (CPU) 350. Access to the number of consecutive frames may be provided though a RT summarization control parameter 355 within an application layer executing in a user space of the OS. DSP 385 may utilize scene/shot change detection logic in the segmentation process. Shot boundary detection algorithms attempt to detect the junction between two video shots. They typically compute a difference metric (like pixel gray-level differences, statistical differences, histogram differences, or motion vectors) between every two consecutive images in a video stream and a shot boundary is assumed when the difference exceeds a pre-determined threshold. In exemplary embodiments however, DSP 385 generates frame sets that include far fewer frames than a typical scene. Hence, if scene detection is utilized, each scene will be further divided in to multiple frame sets for the downstream summarization process. In embodiments, the number of frames n in each set is less than 100, advantageously less than 50, and more advantageously between 10 and 30 frames.

Sets of frames are output to hardware accelerator 388, which in the exemplary embodiment includes fixed function logic circuitry implementing RT video summarization system 217. Embodiments employing fixed function logic are well suited to summarizing received video data frames at pace with a high exposure frame rate while consuming minimal power. In an alternative embodiment however, or any known programmable processor, including DSP 385, a core of CPU 350, an execution unit of a graphics processor, or other similar vector processor, may be utilized to implement the logic of RT video summarization system 217 introduced in FIG. 2C. In an exemplary embodiment where hardware accelerator 388 implements the RT video summarization system 217 upstream of video data frame encoding, summary frames may be output from accelerator 388 back to DSP 385 for encoding as still frames. Encoded representations of summary frames from HW accelerator 388A are sent as stream summary frame data 397 to storage/display/transmission pipeline 395. In one exemplary storage pipeline embodiment, stream summary frame data 397 is output to memory/storage 220 (e.g., NVR, DRAM, etc.), which may be separate or a part of a main memory 310 accessible to CPU 350. Alternatively, or in addition, storage/display/transmission pipeline 395 is to transmit summary frame data 397 off device platform 303.

Figure 4A:
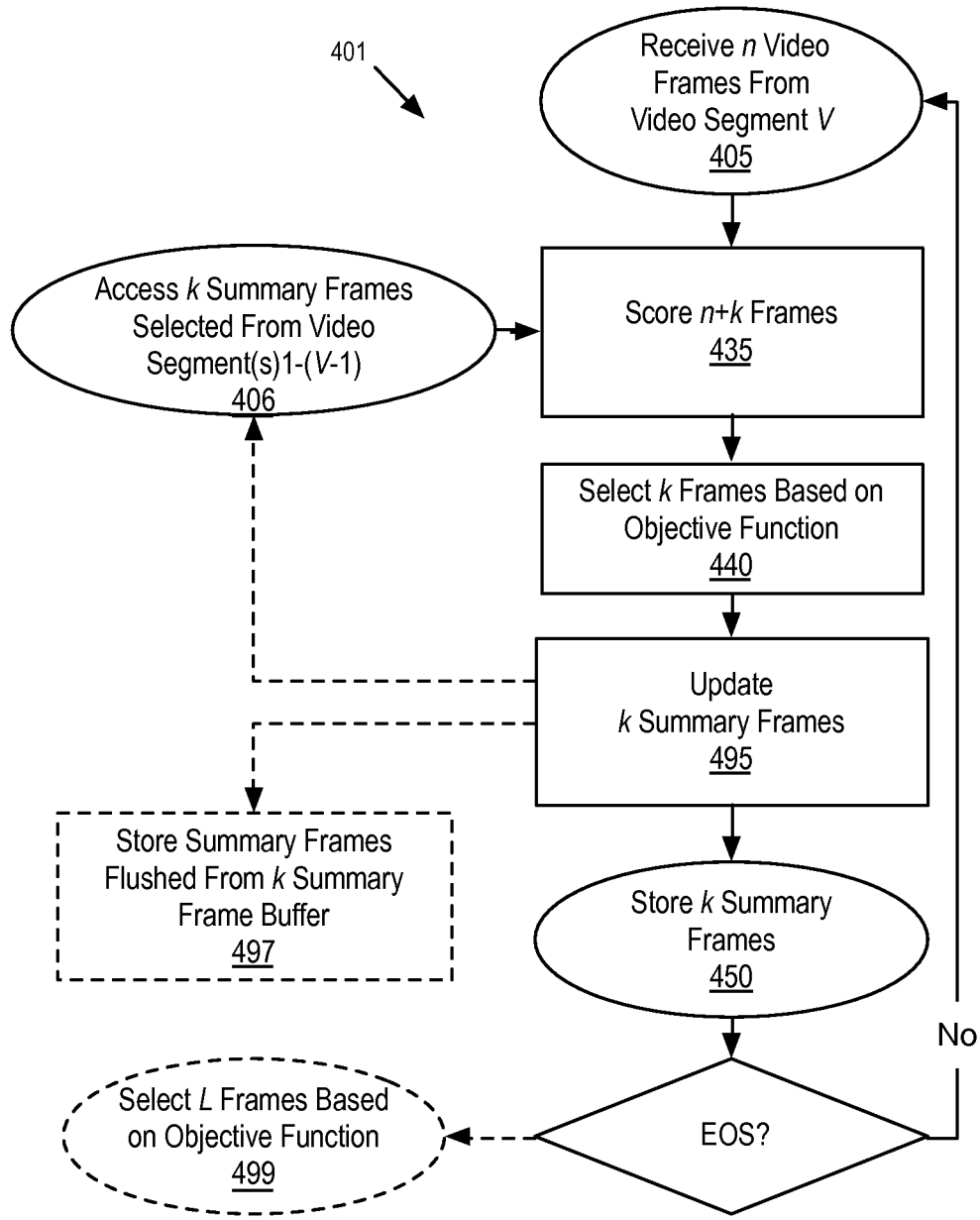
FIG. 4A is a flow diagram further illustrating a RT captured video data stream summarization method in accordance with embodiments.

FIG. 4A is a flow diagram further illustrating a real time (RT) captured video summarization method 401 in accordance with embodiments. Method 401 is performed by a RT video summarization system, and in one exemplary embodiment, is implemented by HW accelerator 388 depicted in FIG. 3. Method 401 is to be performed at a rate sufficient to avoid an upstream buffer overrun condition. In an advantageous embodiment, method 401 is iterated at a rate at least equal to (and advantageously greater than) the CM frame rate divided by the number of new frames (e.g., n) processed in each iteration.

Method 401 begins with receiving a new set of n consecutively exposed video frames contained in a video segment V. At operation 406, a current stream summary comprising batch of one or more k stream summary frames is accessed. In exemplary embodiments, the stream summary frame number k is static and predetermined. The number of stream summary frames may be controlled, for example, through subsystem drivers 315 (FIG. 3) within a kernel space of an operating system (OS) instantiated by a central processing unit (CPU) 350. Access to the number of consecutive frames may be provided through a RT summarization control parameter 355 within an application layer executing in a user space of the OS. In embodiments, the number of steam summary frames k is less than 1000, advantageously less than 100, and more advantageously between 10 and 30 frames.

Figure 4B:
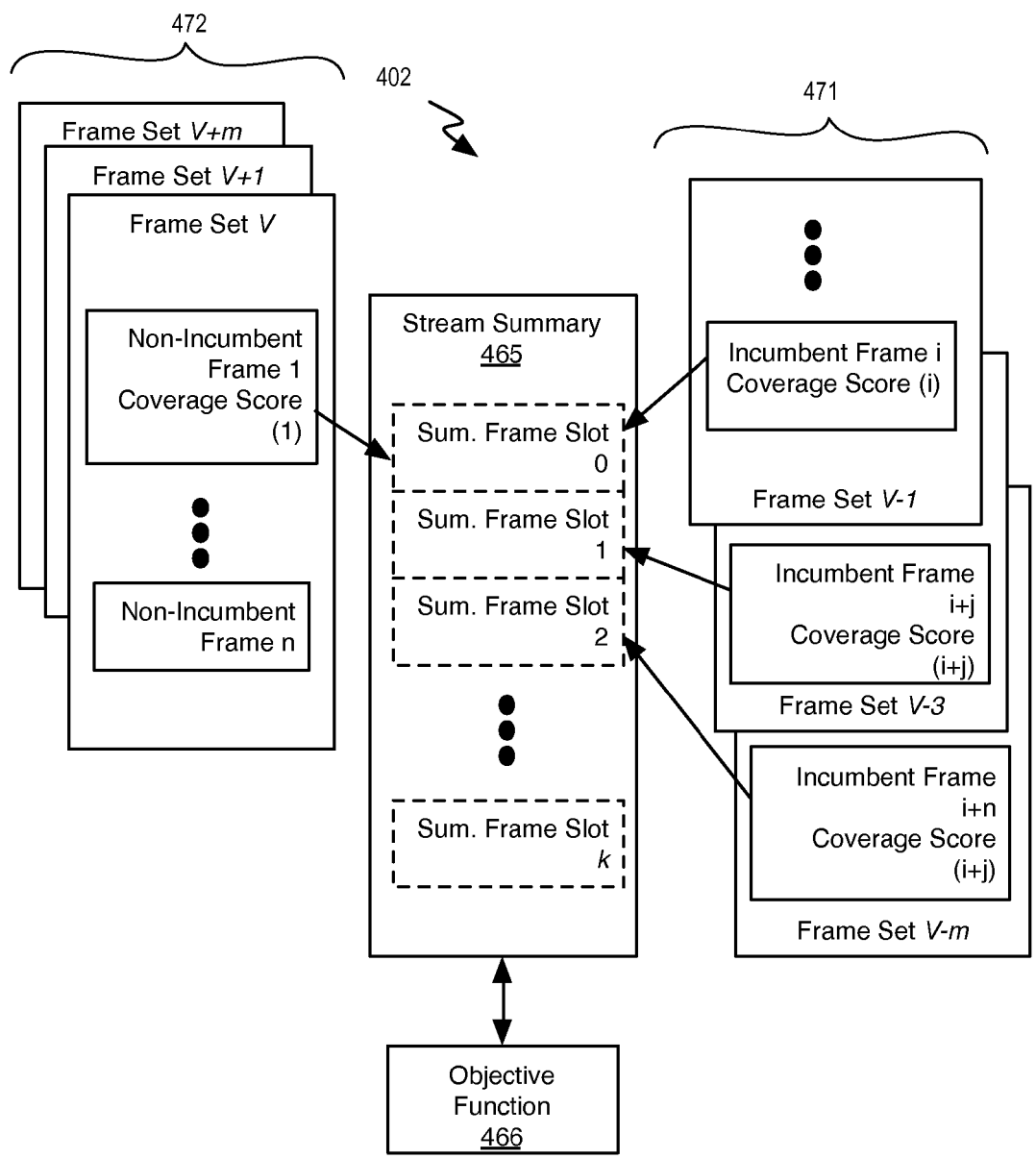
FIG. 4B illustrates a RT captured video data stream summarization model, in accordance with one or more embodiment.

Each frame in the batch of k stream summary frames was previously selected during one or more prior iteration of method 401. FIG. 4B illustrates a RT video summarization model 402 that is implemented by one or more embodiment of method 401. As shown in FIG. 4B, stream summary 465 comprises a selection of video data frames limited to a predetermined number of summary frame slots. With k slots available, k incumbent stream summary frames summarize any number of prior frame sets 471 that were exposed and processed through the summarization process earlier in time. For example, a snapshot of stream summary 465 includes incumbent frame i from set V most recently processed, incumbent frame i+j from a frame set V−3, etc. Looking forward in time, any number of new frame sets 472 will be exposed and processed through the summarization process later in time (e.g., beginning with set V, and ending with V+m). In response to receiving each new frame set (e.g., V, V+1, etc.) a summarization iteration is performed where the incumbent k stream summary frames and n non-incumbent frames are the batch of candidate frames for selection through application of an objective function 466. With each iteration, one or more incumbent frame may retain a slot within stream summary 465, and one or more incumbent frame may be evicted from stream summary 465 in preference of a non-incumbent frame included in a new set (e.g., set V+1).

As further illustrated in FIG. 4A, each of the candidate frames (n+k) from operations 405 and 406 are scored at operation 435. Each non-incumbent frame in a new set of frames received from the CM is scored with respect to the other frames in the new set, and with respect to each incumbent frame. At operation 440, the batch including one or more summary frame is selected from the candidate frame pool including the non-incumbent and the incumbent frames. The objective function is solved at operation 440 to compute the reward (loss) associated with a given selection of summary frames. Candidate frames are selected based on the solution that optimizes the frame scoring for the selection. At operation 495, the batch of k stream summary frames is updated in response to the selection of frames made at operation 440 differing from the batch of k stream summary frames accessed at operation 406. Updating the stream summary at operation 495 includes adding at least each selected non-incumbent frame to the summary. In an exemplary embodiment, the addition of the non-incumbent frame may entail replacing an incumbent frame flushed out of the summary in preference for the non-incumbent frame. In further embodiments where a frame and a coverage score is to be stored for each stream summary slot, and as described in more detail below, updating the stream summary at operation 495 further includes adding to the stream summary a coverage score associated with each non-incumbent frame selected. For example, a coverage score associated with an evicted incumbent frame may be overwritten with the coverage score associated with the newly selected frame. The updated batch of k summary frames is stored to memory at operation 450. If the end of stream (EOS) has not been reached, method 401 returns to operation 405 for a subsequent iteration. If the EOS has been reached, method 401 ends with the stream summary frames stored.

In the above embodiment, when an incumbent summary frame is evicted due to the arrival of newer, a more informative frame, the incumbent summary frame is removed from further consideration. In embodiments having sufficient available memory however, the incumbent summary frame(s) flushed at the summary update operation 495 is stored to a secondary memory (location) to potentially enhance the quality of a final video summary generated by method 401. Secondary storage operation 497 is illustrated in FIG. 4A with dashed line to emphasize that retention of all summary frames iteratively generated during video streaming is optional. For those embodiments where all summary frames are retained, upon reach an EOS condition, method 401 proceeds to operation 499 where a secondary selection of L summary frames is made. In the exemplary embodiment, operation 499 entails solving the same objective function solved at the (primary) selection operation 440 based on the frame scores previously generated at operation 435 and the feature vector associated with each stored summary frame. The number of final selected frames L may be equal to, or larger than, the batch of k summary frames, and may be a configurable value in the same manner as the values of n and k. The secondary selection operation 499 is among the set of salient frames stored over time both to the memory slots associated with the batch of k summary frames and the those stored to secondary memory slots.

Thus, method 401 becomes a two-tier process in which salient frames are first filtered out from video segments and final summary frames are then selected from all salient frames.

Figure 5A:
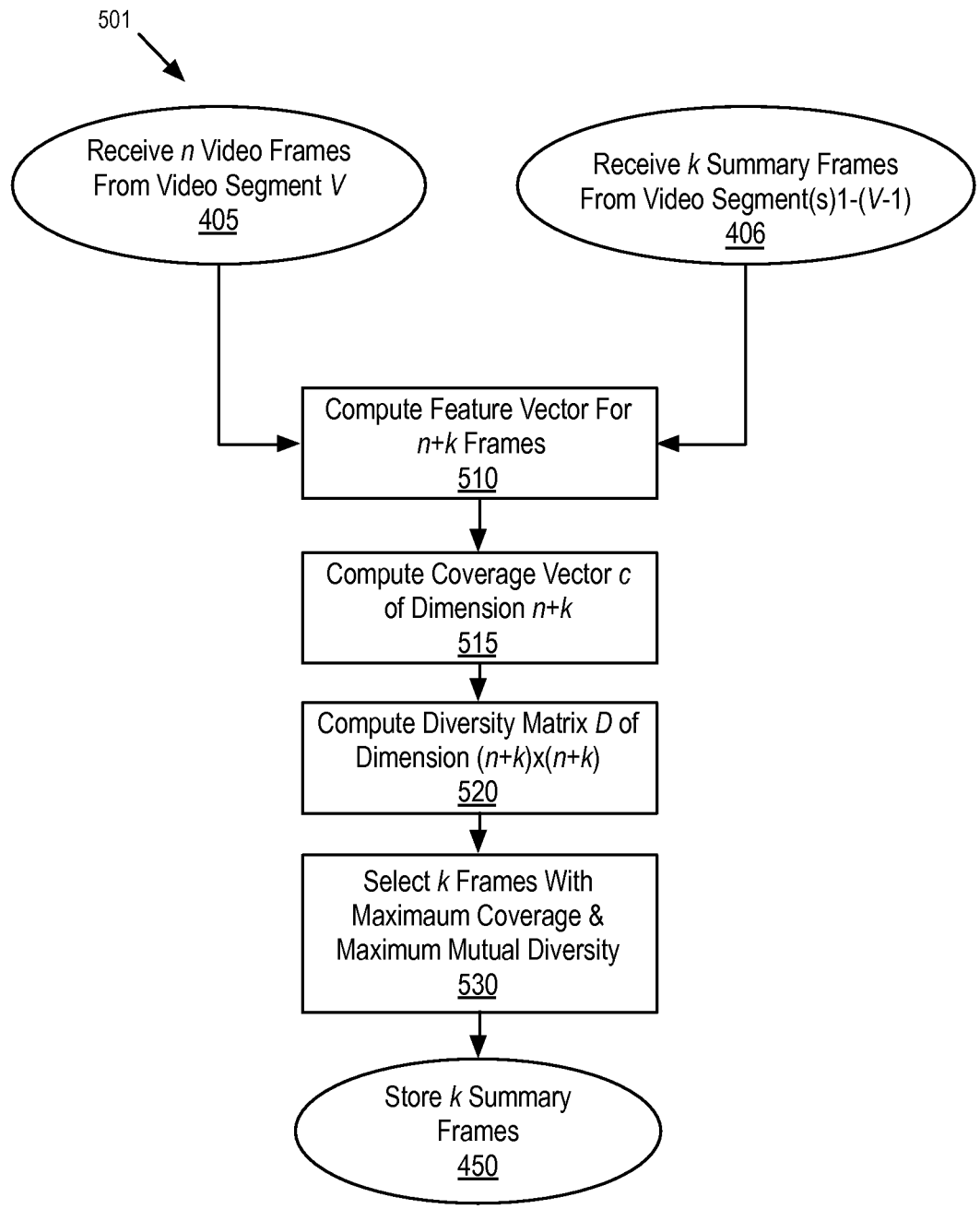
FIG. 5A is a flow diagram illustrating a RT captured video summarization method, in accordance with one or more embodiment.

FIG. 5A is a flow diagram illustrating a real time (RT) captured video summarization method 501, in accordance with one such embodiment. Method 501 is performed, for example, as part of method 401 (FIG. 4A). Method 501 begins with receiving n non-incumbent candidate video frames at operation 405, and receiving k incumbent stream summary frames at operation 406, as described above. A feature vector is computed for the n+k frames at operation 510. The feature vector may include features determined using any object detection technique known in the art. In the exemplary embodiment, a feature vector comprising histograms of oriented gradient (HOG) features is generated at operation 406 for each of the n+k frames. Alternatively, feature vectors for n frames are computed at operation 406 with the feature vectors for the k summary frames, having been generated previously in an earlier iteration, fetched from memory.

Figure 5B:
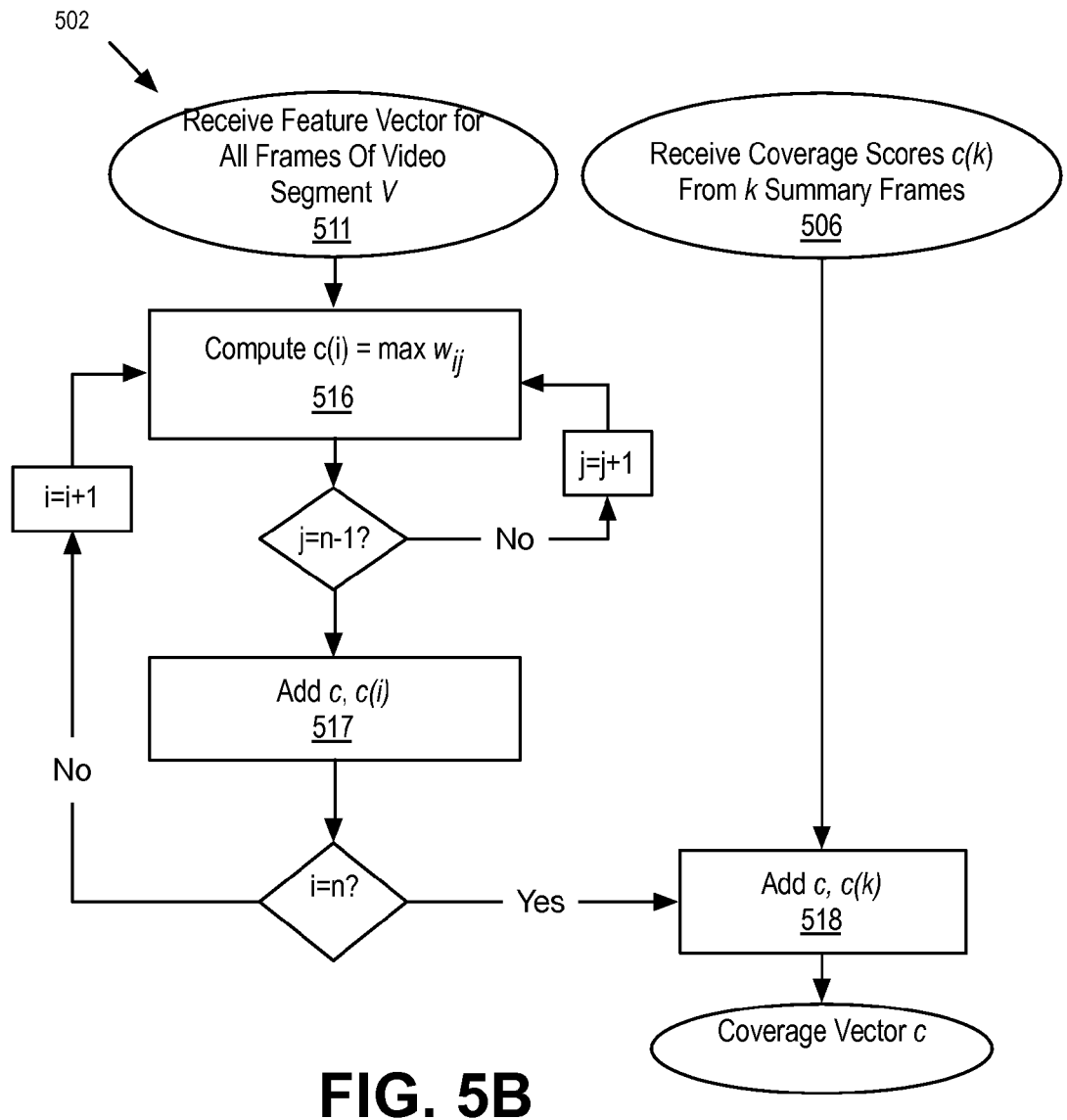
FIG. 5B is a flow diagram illustrating a video frame coverage scoring method, in accordance with one or more embodiment.

Method 501 continues with operation 515 where a coverage vector c of dimension n+k is computed. One exemplary embodiment of operation 515 is further illustrated in FIG. 5B as method 502. The feature vectors for all frames of a video segment V are received at operation 511. Operation 516 is then iterated to compute one non-incumbent coverage score for each frame i with respect to n−1 other non-incumbent frames. Element i in the coverage vector c is computed for a received frame set V as:

$$c(i) = \max w_{ij}; j \in V, \qquad (1)$$

where $w_{ij}$ denotes the similarity between the feature vectors associated with the pair of frames i and j in the frame set V. While there are many techniques for measuring similarity of two vectors, the inventors have found the cosine similarity metric to work well for HOG feature vectors. The similarity metric utilized in method 502 may be controlled, for example, through subsystem drivers 315 (FIG. 3) within a kernel space of an operating system (OS) instantiated by a central processing unit (CPU) 350. Access to the similarity metric may be further provided through a RT summarization control parameter 355 within an application layer executing in a user space of the OS. Computation of the maximum value of the similarity metric for each frame in the new frame set V advantageously limits the coverage score to a vector. At operation 517 (FIG. 5B), each c(i) computed at operation 516 is added or joined as a new element to the coverage vector c.

Method 502 continues with receiving incumbent coverage scores c(k) associated with the k incumbent stream summary frames at operation 506. In the exemplary embodiment, the incumbent coverage scores c(k) are fetch from memory, having been stored from prior iterations of method 501, which invoked method 502. At operation 518, the n elements of coverage vector c are joined with the k stored coverage scores c(k) so that the coverage vector c that encompasses all candidate frames (incumbent and non-incumbent).

Figure 5C:
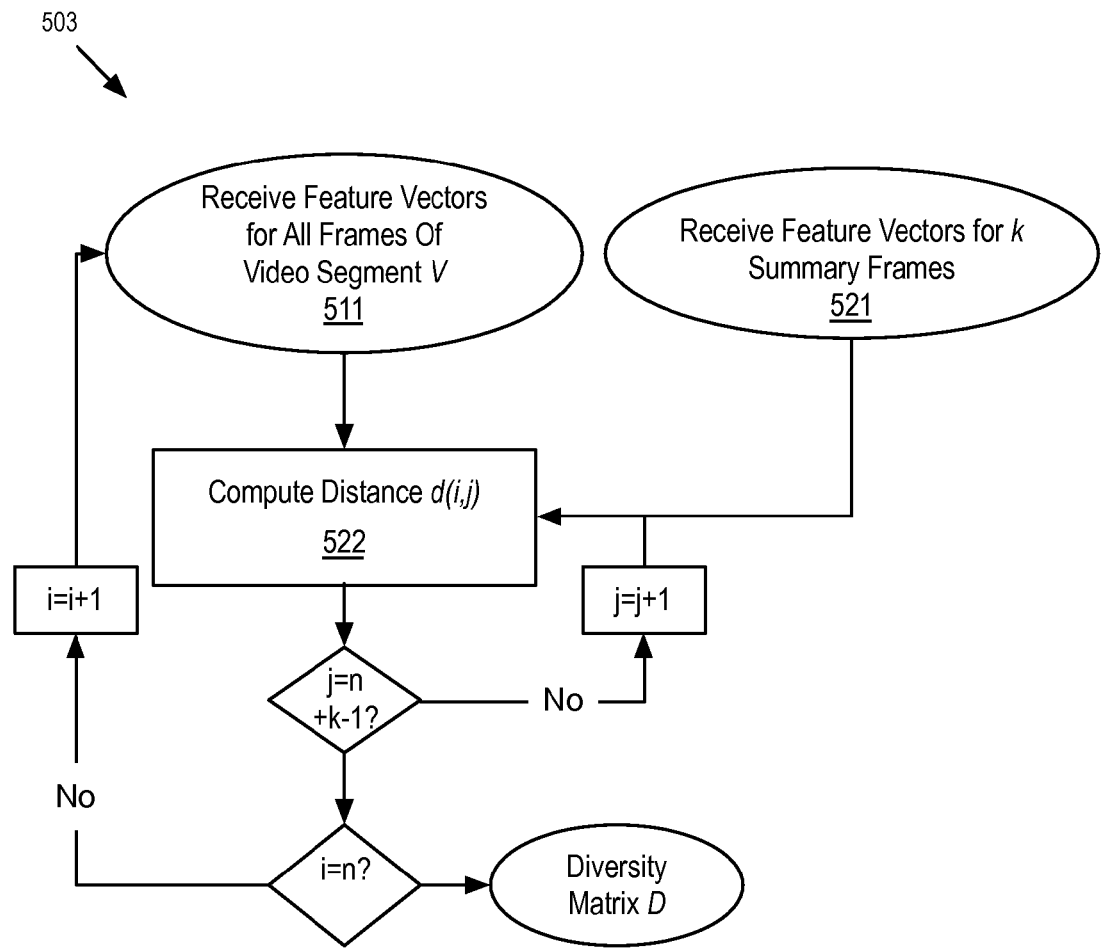
FIG. 5C is a flow diagram illustrating a video frame diversity scoring method, in accordance with one or more embodiment.

Returning to FIG. 5A, method 501 continues at operation 520 where a 2D diversity matrix is computed. The diversity matrix includes a diversity score for each frame in the newly received set V with respect to the other frames in the set and with respect to each incumbent frame. The diversity score is a metric indicative of distance between the feature vectors computed at operation 510. For the exemplary embodiment where the feature vector is a HOG vector, the diversity score is indicative of a distance between color histograms for pairings of all frames in the candidate pool. One exemplary embodiment of operation 520 is further illustrated in FIG. 5C as method 503. As shown in FIG. 5C, the feature vectors for all frames of a video segment V are again received at operation 511. Additionally, the feature vectors for all k summary frames are received at operation 521. At operation 522, distances between all exclusive pairs of n+k feature vectors are computed to populate the diversity matrix D, with element (i j) computed as:

$$D(i,j) = d_{ij}, \qquad (2)$$

where $d_{ij}$ is the distance metric between frames i and j. The distance metric $d_{ij}$ may be any known in the art, such as, but not limited to, the Euclidean, Chi-squared, and Mahalanobis distance. In the exemplary embodiment where the feature vectors are HOG vectors, the Chi-squared distance metric has been found to be advantageous for generating diversity matrix D. The like the similarity metric, the distance metric utilized in method 503 may be controlled, for example, through subsystem drivers 315 (FIG. 3) within a kernel space of an operating system (OS) instantiated by a central processing unit (CPU) 350. Access to the distance metric may be further provided through a RT summarization control parameter 355 within an application layer executing in a user space of the OS.

Figure 5D:
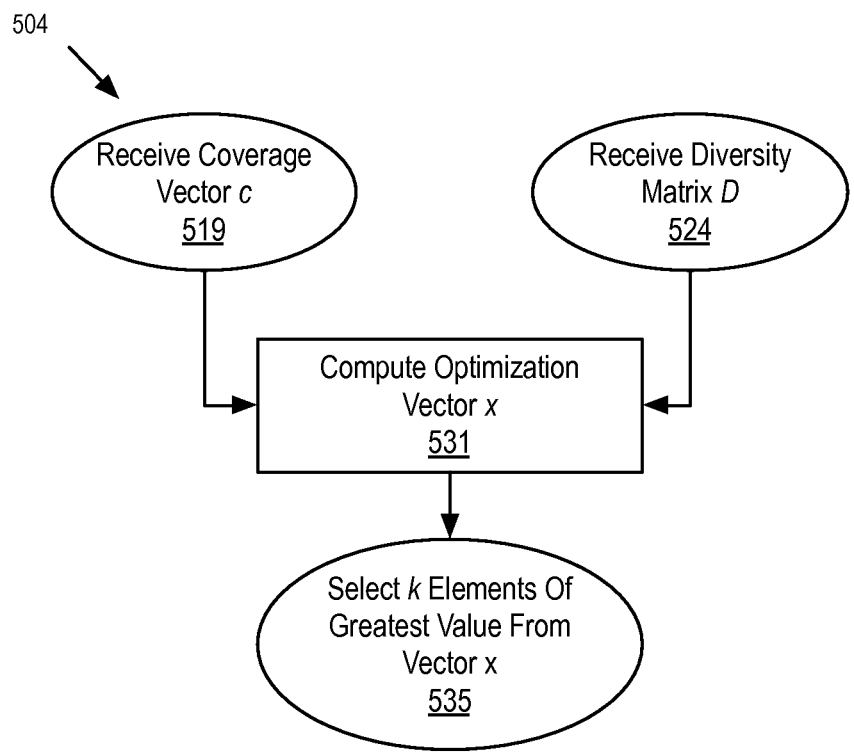
FIG. 5D is a flow diagram illustrating a method of selecting frames for a stream summary, in accordance with one or more embodiment.

Returning to FIG. 5A, method 501 continues at operation 530 where the batch of stream summary frames are selected for the current iteration based the coverage and diversity scores for the selection. One exemplary embodiment of operation 530 is further illustrated in FIG. 5D as method 504. Coverage vector c and diversity matrix D are received at operations 519, 524. At operation 531 and optimization vector x is to identify a set of k frames with maximal coverage and maximal mutual diversity. Considering a binary vector x of dimension n+k in which element i denotes whether frame i is to be included in the stream summary. Because of the dimensionality of the coverage and diversity scores, the selection can thus be formalized as the integer quadratic programming (QP) problem:

$$\max_{x} c^T x + \frac{1}{2} x^T D x, \qquad (3)$$

where $x^T$ is the vector transpose of x, and such that:

$$x_i \in \{0,1\}, \forall i \text{ and } \Sigma_{i=1}^{n+k} x_i = k. \qquad (4)$$

The solution to equation 3 however, is NP-hard if integer constraints are placed on the variable vector x. Therefore, in advantageous embodiments, the integer constraints are relaxed and allowed to be continuous, where every element in the vector x is constrained to be a real number between 0 and 1. Equation 3 is then readily solvable using any known QP solver. The top k entries in the solution vector may then be set to 1 and the remainder set to 0, to reconstruct the integer solution. This optimization vector identifies the non-incumbent frames and incumbent frames to be discarded (0 valued elements) and selected as summary frames (1 valued elements).

Returning to FIG. 5A, method 501 then ends with the storing k summary frames at operation 450. In advantageous embodiments, for each frame stored at operation 450, the corresponding coverage score is stored in association with the frame to facilitate a subsequent comparison with a next set of frames (e.g., to be read in at 506 in FIG. 5B). One non-selected incumbent frame is removed/replaced in the stream summary for each non-incumbent frame selected.

Any coverage score associated with the non-selected incumbent frame is also removed/replaced.

Figure 7:
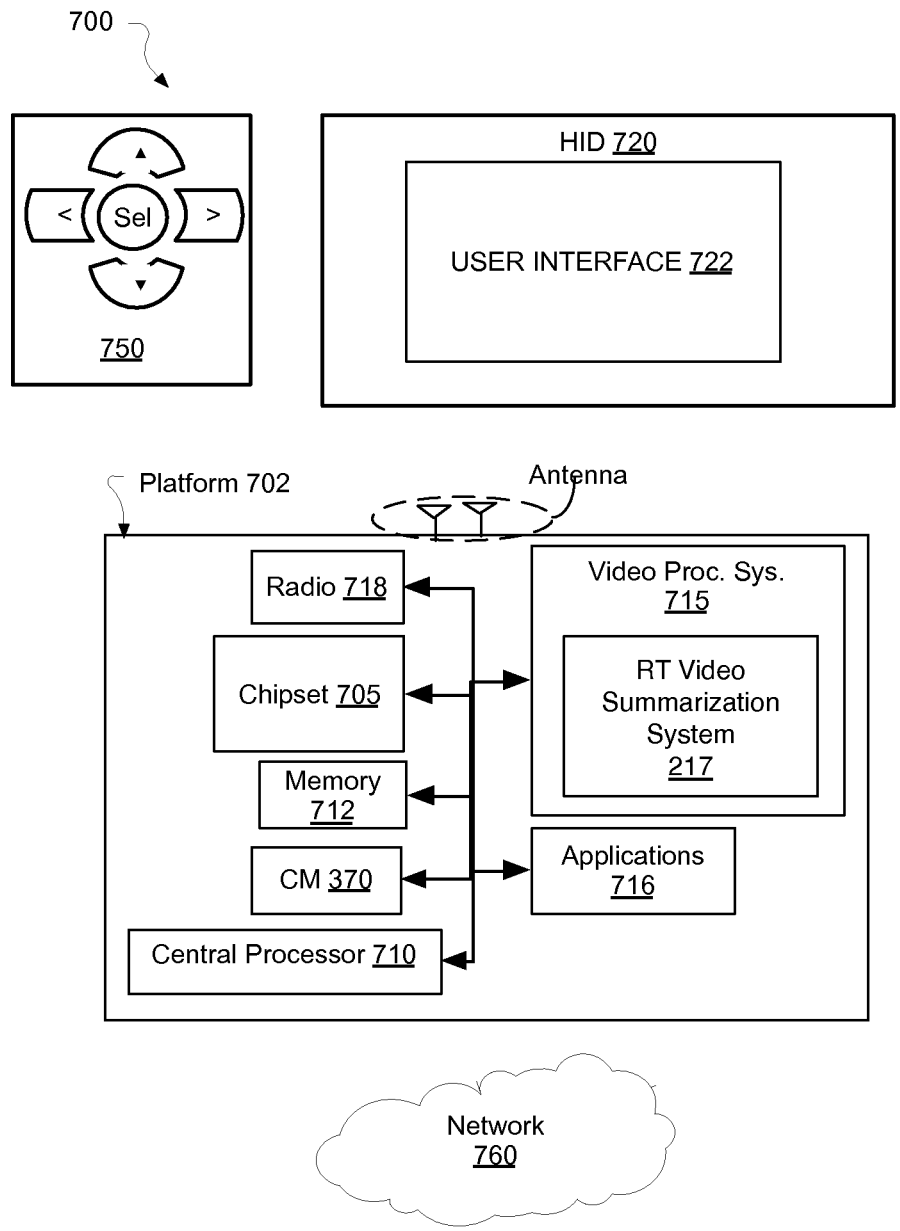
FIG. 7 is a diagram of an exemplary ultra-low power system employing a RT video data stream capture and summarization architecture, in accordance with one or more embodiment.

FIG. 7 is a diagram of an exemplary ultra-low power system 700 employing a RT video data stream capture and summarization architecture, in accordance with one or more embodiment. System 700 may be a mobile device although system 700 is not limited to this context. For example, system 700 may be incorporated into a wearable computing device, ultra-laptop computer, tablet, touch pad, handheld computer, palmtop computer, cellular telephone, smart device (e.g., smart phone, smart tablet or mobile television), mobile internet device (MID), messaging device, data communication device, and so forth. System 700 may also be an infrastructure device. For example, system 700 may be incorporated into a large format television, set-top box, desktop computer, or other home or commercial network device.

System 700 includes a device platform 702 that may implement all or a subset of the various streaming video camera summarization methods and any of the RT streaming video summarization systems described above in the context of FIG. 1-FIG. 6. In various exemplary embodiments, video processor 715 executes RT video summarization algorithms. Video processor 715 includes logic circuitry implementing RT video summarization system 217 to iteratively generate sets of video summary images synchronously with video frame data streamed from CM 370, for example as described elsewhere herein. In some embodiments, one or more computer readable media may store instructions, which when executed by CPU 710 and/or video processor 715, cause the processor(s) to execute one or more RT video summarization algorithm, such as any of those described in detail above. One or more image data frame exposed by CM 370 may then be stored in memory 712 as streamed video summary data.

In embodiments, device platform 702 is coupled to a human interface device (HID) 720. Platform 702 may collect raw image data with CM 370, which is processed and output to HID 720. A navigation controller 750 including one or more navigation features may be used to interact with, for example, device platform 702 and/or HID 720. In embodiments, HID 720 may include any television type monitor or display coupled to platform 702 via radio 718 and/or network 760. HID 720 may include, for example, a computer display screen, touch screen display, video monitor, television-like device, and/or a television.

Under the control of one or more software applications 716, device platform 702 may display user interface 722 on HID 720. Movements of the navigation features of controller 750 may be replicated on a display (e.g., HID 720) by movements of a pointer, cursor, focus ring, or other visual indicators displayed on the display. For example, under the control of software applications 716, the navigation features located on navigation controller 750 may be mapped to virtual navigation features displayed on user interface 722.

In embodiments, device platform 702 may include any combination of CM 370, chipset 705, processors 710, 715, memory/storage 712, applications 716, and/or radio 718. Chipset 705 may provide intercommunication among processors 710, 715, memory 712, video processor 715, applications 716, or radio 718.

One or more of processors 710, 715 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 712 may be implemented as a volatile memory device such as, but not limited to, a Random Access Memory (RAM), Dynamic Random Access Memory (DRAM), or Static RAM (SRAM). Memory 712 may also be implemented as a non-volatile storage device such as, but not limited to flash memory, battery backed-up SDRAM (synchronous DRAM), magnetic memory, phase change memory, and the like.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The RT streaming video summarization architecture and associated summarization processes as described herein may be implemented in various hardware architectures, cell designs, or "IP cores."

Figure 8:
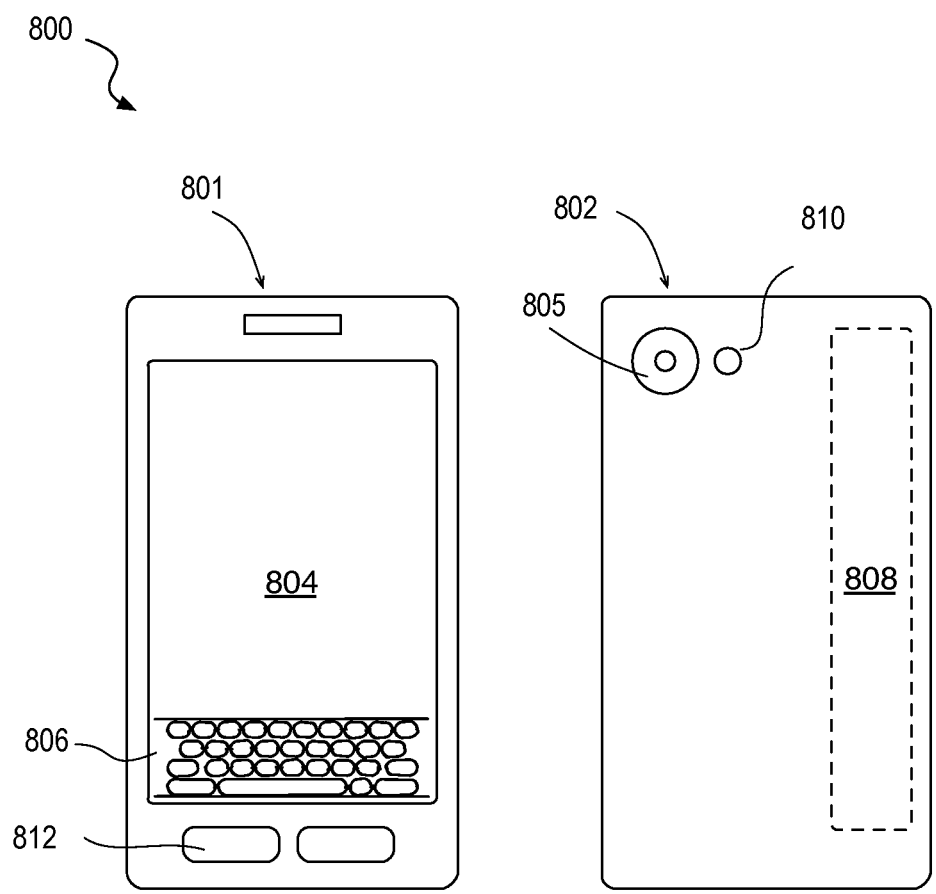
FIG. 8 is a diagram of an exemplary mobile handset platform, arranged in accordance with one or more embodiment.

As described above, system 700 may be embodied in varying physical styles or form factors. FIG. 8 further illustrates embodiments of a mobile handset device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example. Examples of a mobile computing device may include an ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications.

Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, mobile handset device 800 may include a housing with a front 801 and back 802. Device 800 includes a display 804, an input/output (I/O) device 806, and an integrated antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone (not shown), or may be digitized by a voice recognition device. Embodiments are not limited in this context. Integrated into at least the back 802 is camera 805 (e.g., including a lens, an aperture, and an imaging sensor), and a flash 810, both of which may be components of a CM through which streaming video is exposed and output to the video summarization system as described elsewhere herein.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiments, a captured video data stream summarization method includes receiving a stream of consecutively exposed video data frames from a camera hardware module (CM). The method includes iteratively evaluating a stream summary comprising one or more of the video data frames based on each new set of frames received from the CM. The evaluating further includes scoring each non-incumbent frame in a new set of frames received from the CM with respect to the other frames in the new set, and with respect to each incumbent frame included in the stream summary from a prior iteration. The evaluating further includes selecting frames, from a pool including the non-incumbent and the incumbent frames, based on a solution to an objective function that optimizes the frame scoring for the selection. The method further includes updating the stream summary stored in a memory in response to selecting a non-incumbent frame in preference over an incumbent frame.

In furtherance of the one or more first embodiment, scoring each non-incumbent frame further includes computing a feature vector for each frame in the new set. Scoring each non-incumbent frame further includes computing a non-incumbent coverage score, based on the feature vectors, for each frame in the new set with respect to the other frames in the new set. Scoring each non-incumbent frame further includes computing a diversity score, based on the feature vectors, for each frame in the new set with respect to the other frames in the new set and with respect to each incumbent frame. The method further includes selecting one or more frame further comprises populating a predetermined number of summary frame slots with the incumbent frames and the non-incumbent frames associated with a solution to the objective function that maximizes the coverage scores and diversity scores for the selection.

In furtherance of the embodiment immediately above, the feature vector is based on histograms of oriented gradient (HOG). Computing the non-incumbent coverage score comprises determining a coverage vector including a maximum value of a similarity metric for each frame in the new set. Computing the diversity score comprises determining a 2D diversity matrix comprising the distance between color histograms for pairings of all frames in the pool.

In furtherance of any of the first embodiments, updating the stream summary further includes adding to the stream summary each non-incumbent frame selected and adding to the stream summary a coverage score associated with each non-incumbent frame selected. Scoring each non-incumbent frame further includes computing a feature vector for each frame in the set. Scoring each non-incumbent frame further includes computing a non-incumbent coverage score, based on the feature vectors, for each frame in the set with respect to the other frames in the set. The method further includes computing a 2D diversity matrix, based on the feature vectors, the matrix including a diversity score for each frame in the in the set with respect to the other frames in the set and with respect to each incumbent frame. Selecting one or more frame further includes computing a coverage vector by joining the non-incumbent coverage scores with the stored coverage scores. Selecting one or more frame further includes solving an objective function including the coverage vector and the diversity matrix for an optimization vector having the maximum diversity score and maximum coverage score. Selecting one or more frame further includes selecting the non-incumbent frames and incumbent frames identified by the optimization vector.

In furtherance of the one or more first embodiment, updating the stream summary further include adding to the stream summary each non-incumbent frame selected. Updating the stream summary further includes adding to the stream summary a coverage score associated with each non-incumbent frame selected. Updating the stream summary further includes dropping from the stream summary one non-selected incumbent frame for each non-incumbent frame selected. Updating the stream summary further includes dropping from the stream summary a coverage score associated with each non-selected incumbent frame removed from the stream summary.

In furtherance of the embodiment immediately above, the stream summary comprises a predetermined number of stream summary frame slots. Each incumbent frame occupies one of the summary frame slots. Updating the stream summary further includes swapping the contents of a summary frame slot associated with an incumbent frame flushed in preference for non-incumbent frame. The method further includes overwriting video data frames summarized by the stream summary with more recently exposed video data frame data.

In furtherance of the embodiment immediately above, the method further includes storing, to a secondary memory, each frame and associated coverage value removed from a stream summary slot. The method further includes performing a secondary selection of frames, from a pool of frames including those associated with the summary frame slots and those stored to the secondary memory, based on a solution to the objective function that optimizes the frame scoring for a predetermined number of slots of a secondary stream summary. The method further includes storing the frames from the secondary selection to the memory.

In furtherance of the first embodiment the stream received from the CM is associated with a frame rate, and the evaluating is iterated at a rate at least equal to the frame rate divided by a predetermined number of frames included in each new set.

In furtherance of the first embodiment, the method further includes storing, to a secondary memory, a representation of the stream having more frames than the stream summary, and indexing the stream representation based on the stream summary.

In one or more second embodiment, a video data stream capture and summarization system includes a camera hardware module (CM) to generate a stream of consecutively exposed video data frames. The system includes logic circuitry coupled to the CM to iteratively evaluate a stream summary comprising one or more of the frames based on each new set of received from the CM. The logic circuitry further includes frame scoring logic to score each non-incumbent frame in a new set of frames received from the CM with respect to the other frames in the new set, and with respect to each incumbent frame included in the stream summary from a prior iteration. The logic circuitry further includes frame selection logic to select frames, from a pool including the non-incumbent and the incumbent frames, based on a solution to an objective function that optimizes the frame scoring for the selection. The system includes logic circuitry to update the stream summary stored in a memory in response to selecting a non-incumbent frame in preference over an incumbent frame.

In furtherance of the second embodiment, the frame scoring logic is further to compute a feature vector for each frame in the new set. The frame scoring logic is further to compute a non-incumbent coverage score, based on the feature vectors, for each frame in the new set with respect to the other frames in the new set. The frame scoring logic is further to compute a diversity score, based on the feature vectors, for each frame in the new set with respect to the other frames in the new set and with respect to each incumbent frame.

In furtherance of the second embodiment, the frame scoring logic is further to compute a feature vector for each frame in the new set, the feature vector based on histograms of oriented gradient (HOG). The frame scoring logic is further to compute a non-incumbent coverage score, based on the feature vectors, for each frame in the new set with respect to the other frames in the new set by determining a coverage vector including a maximum value of a similarity metric for each frame in the new set. The frame scoring logic is further to compute a diversity score, based on the feature vectors, for each frame in the new set with respect to the other frames in the new set and with respect to each incumbent frame by determining a 2D diversity matrix comprising the distance between color histograms for pairings of all frames in the pool.

In furtherance of the second embodiment, the logic circuitry to update the stream summary is to add to the stream summary each non-incumbent frame selected, and add to the stream summary a coverage score associated with each non-incumbent frame selected. The frame scoring logic is further to compute a feature vector for each frame in the set. The frame scoring logic is further to compute a non-incumbent coverage score, based on the feature vectors, for each frame in the set with respect to the other frames in the set, The frame scoring logic is further to compute a coverage vector by joining the non-incumbent coverage scores with the stored coverage scores. The frame scoring logic is further to compute a 2D diversity matrix, based on the feature vectors, the matrix including a diversity score for each frame in the in the set with respect to the other frames in the set and with respect to each incumbent frame. The frame selection logic is further to solve an objective function including the coverage vector and the diversity matrix for an optimization vector having the maximum diversity score and maximum coverage score, and select the non-incumbent frames and incumbent frames identified by the optimization vector.

In furtherance of the second embodiment, the logic circuitry to update the stream summary is to add to the stream summary each non-incumbent frame selected, add to the stream summary a coverage score associated with each non-incumbent frame selected, drop from the stream summary one non-selected incumbent frame for each non-incumbent frame selected, and drop from the stream summary a coverage score associated with each non-selected incumbent frame removed from the stream summary.

In furtherance of the embodiment immediately above, the stream summary is associated with a predetermined number of stream summary frame slots. Each incumbent frame occupies one of the summary frame slots. The logic circuitry to update the stream summary is to swap the contents of a summary frame slot associated with an incumbent frame flushed in preference for non-incumbent frame. The system further includes a circular buffer to overwrite video data frames summarized by the stream summary with more recently exposed video data frame data In furtherance of the embodiment immediately above, the system further includes a secondary memory to store each frame and associated coverage value removed from a stream summary slot. The frame selection logic is to perform a secondary selection of frames, from a pool of frames including those associated with the summary frame slots and those stored to the secondary memory, based on a solution to the objective function that optimizes the frame scoring for the selected frames.

In one or more third embodiment, a computer-readable storage media has instructions stored thereon, which when executed by a processor, cause the processor to perform the method recited in any of the first embodiments.

In furtherance of the third embodiment, a computer-readable storage media, has instructions stored thereon, which when executed by a processor, causes the processor to perform a method including iteratively evaluating a stream summary comprising one or more of video data frames from a stream of consecutively exposed video data frames based on each new set of frames received. The evaluating further includes scoring each non-incumbent frame in a new set of frames received from the CM with respect to the other frames in the new set, and with respect to each incumbent frame included in the stream summary from a prior iteration. The media further causes the processor to perform a method including selecting frames, from a pool including the non-incumbent and the incumbent frames, based on a solution to an objective function that optimizes the frame scoring for the selection. The instructions further cause the processor to perform a method including updating the stream summary stored in a memory in response to selecting a non-incumbent frame in preference over an incumbent frame.

In furtherance of the embodiment immediately above, the media further includes instructions stored thereon, which when executed by the processor, further cause the processor to perform the method further including updating the stream summary by adding to the stream summary each non-incumbent frame selected, adding to the stream summary a coverage score associated with each non-incumbent frame selected, scoring each non-incumbent frame by computing a feature vector for each frame in the set, and computing a non-incumbent coverage score, based on the feature vectors, for each frame in the set with respect to the other frames in the set. The method further includes computing a 2D diversity matrix, based on the feature vectors, the matrix including a diversity score for each frame in the in the set with respect to the other frames in the set and with respect to each incumbent frame. The method further includes selecting one or more frame by computing a coverage vector by joining the non-incumbent coverage scores with the stored coverage scores, solving an objective function including the coverage vector and the diversity matrix for an optimization vector having the maximum diversity score and maximum coverage score, and selecting the non-incumbent frames and incumbent frames identified by the optimization vector.

In furtherance of embodiment above, the feature vector is based on histograms of oriented gradient (HOG). The method further includes computing the non-incumbent coverage score comprises determining a coverage vector including a maximum value of a similarity metric for each frame in the new set, and computing the diversity score comprises determining a 2D diversity matrix comprising the distance between color histograms for pairings of all frames in the pool.

In furtherance of the third embodiment, the media further includes instructions which when executed cause the system to perform the method further including storing, to a secondary memory, each frame and associated coverage value removed from a stream summary slot, performing a secondary selection of frames, from a pool of frames including those associated with the summary frame slots and those stored to the secondary memory, based on a solution to the objective function that optimizes the frame scoring for a predetermined number of slots of a secondary stream summary, and storing the frames from the secondary selection to the memory.

In one or more fourth embodiment, a video data stream capture and summarization system includes a video recording means to generate a stream of consecutively exposed video data frames. The system includes a video summarization means coupled to the video recording means to iteratively evaluate a stream summary comprising one or more of the frames based on each new set of received from the video recording means by performing any one of the methods in the first embodiment.

In furtherance of the fourth embodiment, the video summarization means further includes a frame scoring means to score each non-incumbent frame in a new set of frames received from the video recording means with respect to the other frames in the new set, and with respect to each incumbent frame included in the stream summary from a prior iteration. The summarization means further includes a frame selection means to select frames, from a pool including the non-incumbent and the incumbent frames, based on a solution to an objective function that optimizes the frame scoring for the selection. The video summarization means further includes a summary updating means to update the stream summary stored in a memory in response to selecting a non-incumbent frame in preference over an incumbent frame.

In furtherance of the embodiment immediately above the summary updating means is to add to the stream summary each non-incumbent frame selected, and add to the stream summary a coverage score associated with each non-incumbent frame selected. The frame scoring means is further to compute a feature vector for each frame in the set, compute a non-incumbent coverage score, based on the feature vectors, for each frame in the set with respect to the other frames in the set, compute a coverage vector by joining the non-incumbent coverage scores with the stored coverage scores, and compute a 2D diversity matrix, based on the feature vectors, the matrix including a diversity score for each frame in the in the set with respect to the other frames in the set and with respect to each incumbent frame. The frame selection means is further to solve an objective function including the coverage vector and the diversity matrix for an optimization vector having the maximum diversity score and maximum coverage score, and select the non-incumbent frames and incumbent frames identified by the optimization vector.

In furtherance of the embodiment immediately above, the system further includes a secondary memory to store each frame and associated coverage value removed from a stream summary slot, and the frame selection means is to perform a secondary selection of frames, from a pool of frames including those associated with the summary frame slots and those stored to the secondary memory, based on a solution to the objective function that optimizes the frame scoring for the selected frames.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A captured video data stream summarization method, comprising:
   receiving a stream of consecutively exposed video data frames from a camera hardware module (CM);
   iteratively evaluating a stream summary comprising one or more of the video data frames based on each new set of frames received from the CM, wherein the evaluating further comprises:
   scoring each non-incumbent frame in a new set of frames received from the CM with respect to the other frames in the new set, and with respect to each incumbent frame included in the stream summary from a prior iteration, wherein scoring each non-incumbent frame further comprises:
   computing a feature vector for each frame in the new set;
   computing a non-incumbent coverage score, based on the feature vectors, for each frame in the new set with respect to the other frames in the new set; and
   computing a diversity score, based on the feature vectors, for each frame in the new set with respect to the other frames in the new set and with respect to each incumbent frame;
   selecting frames, from a pool including the non-incumbent and the incumbent frames, based on a solution to an objective function that optimizes the frame scoring for the selection; and
   updating the stream summary stored in a memory in response to selecting a non-incumbent frame in preference over an incumbent frame.

2. The method of claim 1, wherein:
   selecting one or more frame further comprises populating a predetermined number of summary frame slots with the incumbent frames and the non-incumbent frames associated with a solution to the objective function that maximizes the coverage scores and diversity scores for the selection.

3. The method of claim 2, wherein:
   the feature vector is based on histograms of oriented gradient (HOG);
   computing the non-incumbent coverage score comprises determining a coverage vector including a maximum value of a similarity metric for each frame in the new set; and
   computing the diversity score comprises determining a 2D diversity matrix comprising the distance between color histograms for pairings of all frames in the pool.

4. The method of claim 1, wherein:
   updating the stream summary further comprises:
   adding to the stream summary each non-incumbent frame selected;
   adding to the stream summary a coverage score associated with each non-incumbent frame selected;
   scoring each non-incumbent frame further comprises:
   computing a feature vector for each frame in the set;
   computing a non-incumbent coverage score, based on the feature vectors, for each frame in the set with respect to the other frames in the set; and
   computing a 2D diversity matrix, based on the feature vectors, the matrix including a diversity score for each frame in the in the set with respect to the other frames in the set and with respect to each incumbent frame; and
   selecting one or more frame further comprises:
   computing a coverage vector by joining the non-incumbent coverage scores with the stored coverage scores;
   solving an objective function including the coverage vector and the diversity matrix for an optimization vector having the maximum diversity score and maximum coverage score; and
   selecting the non-incumbent frames and incumbent frames identified by the optimization vector.

5. The method of claim 1, wherein:
   updating the stream summary further comprises:
   adding to the stream summary each non-incumbent frame selected;
   adding to the stream summary a coverage score associated with each non-incumbent frame selected;
   dropping from the stream summary one non-selected incumbent frame for each non-incumbent frame selected; and
   dropping from the stream summary a coverage score associated with each non-selected incumbent frame removed from the stream summary.

6. The method of claim 5, wherein:
   the stream summary comprises a predetermined number of stream summary frame slots;
   each incumbent frame occupies one of the summary frame slots;
   updating the stream summary further comprises swapping the contents of a summary frame slot associated with an incumbent frame flushed in preference for non-incumbent frame; and
   the method further comprises:
   overwriting video data frames summarized by the stream summary with more recently exposed video data frame data.

7. The method of claim 6, further comprising:
   storing, to a secondary memory, each frame and associated coverage value removed from a stream summary slot;
   performing a secondary selection of frames, from a pool of frames including those associated with the summary frame slots and those stored to the secondary memory, based on a solution to the objective function that optimizes the frame scoring for a predetermined number of slots of a secondary stream summary; and
   storing the frames from the secondary selection to the memory.

8. The method of claim 1, wherein:
   the stream received from the CM is associated with a frame rate; and the evaluating is iterated at a rate at least equal to the frame rate divided by a predetermined number of frames included in each new set.

9. The method of claim 1, further comprising:
storing, to a secondary memory, a representation of the stream having more frames than the stream summary; and
indexing the stream representation based on the stream summary.

10. A video data stream capture and summarization system, comprising:
a camera hardware module (CM) to generate a stream of consecutively exposed video data frames;
logic circuitry coupled to the CM to iteratively evaluate a stream summary comprising one or more of the frames based on each new set of frames received from the CM, wherein the logic circuitry further comprises:
frame scoring logic to score each non-incumbent frame in a new set of frames received from the CM with respect to the other frames in the new set, and with respect to each incumbent frame included in the stream summary from a prior iteration, wherein the frame scoring logic is further to:
compute a feature vector for each frame in the new set;
compute a non-incumbent coverage score, based on the feature vectors, for each frame in the new set with respect to the other frames in the new set; and
compute a diversity score, based on the feature vectors, for each frame in the new set with respect to the other frames in the new set and with respect to each incumbent frame;
frame selection logic to select frames, from a pool including the non-incumbent and the incumbent frames, based on a solution to an objective function that optimizes the frame scoring for the selection; and
logic circuitry to update the stream summary stored in a memory in response to selecting a non-incumbent frame in preference over an incumbent frame.

11. The system of claim 10, wherein the frame scoring logic is further to:
compute a feature vector for each frame in the new set, the feature vector based on histograms of oriented gradient (HOG);
compute a non-incumbent coverage score, based on the feature vectors, for each frame in the new set with respect to the other frames in the new set by determining a coverage vector including a maximum value of a similarity metric for each frame in the new set; and
compute a diversity score, based on the feature vectors, for each frame in the new set with respect to the other frames in the new set and with respect to each incumbent frame by determining a 2D diversity matrix comprising the distance between color histograms for pairings of all frames in the pool.

12. The system of claim 10, wherein:
the logic circuitry to update the stream summary is to:
add to the stream summary each non-incumbent frame selected;
add to the stream summary a coverage score associated with each non-incumbent frame selected;
the frame scoring logic is further to:
compute a feature vector for each frame in the set;
compute a non-incumbent coverage score, based on the feature vectors, for each frame in the set with respect to the other frames in the set;
compute a coverage vector by joining the non-incumbent coverage scores with the stored coverage scores; and
compute a 2D diversity matrix, based on the feature vectors, the matrix including a diversity score for each frame in the in the set with respect to the other frames in the set and with respect to each incumbent frame; and
the frame selection logic is further to:
solve an objective function including the coverage vector and the diversity matrix for an optimization vector having the maximum diversity score and maximum coverage score; and
select the non-incumbent frames and incumbent frames identified by the optimization vector.

13. The system of claim 10, wherein the logic circuitry to update the stream summary is to:
add to the stream summary each non-incumbent frame selected;
add to the stream summary a coverage score associated with each non-incumbent frame selected;
drop from the stream summary one non-selected incumbent frame for each non incumbent frame selected; and
drop from the stream summary a coverage score associated with each non-selected incumbent frame removed from the stream summary.

14. The system of claim 13, wherein:
the stream summary is associated with a predetermined number of stream summary frame slots;
each incumbent frame occupies one of the summary frame slots;
the logic circuitry to update the stream summary is to swap the contents of a summary frame slot associated with an incumbent frame flushed in preference for non-incumbent frame; and
wherein the system further comprises a circular buffer to overwrite video data frames summarized by the stream summary with more recently exposed video data frame data.

15. The system of claim 14, further comprising:
a secondary memory to store each frame and associated coverage value removed from a stream summary slot; and
wherein the frame selection logic is to perform a secondary selection of frames, from a pool of frames including those associated with the summary frame slots and those stored to the secondary memory, based on a solution to the objective function that optimizes the frame scoring for the selected frames.

16. One or more computer-readable storage media, with instructions stored thereon, which when executed by a processor, cause the processor to perform a method comprising:
iteratively evaluating a stream summary comprising one or more of video data frames from a stream of consecutively exposed video data frames based on each new set of frames received from the CM, wherein the evaluating further comprises:
scoring each non-incumbent frame in a new set of frames received from the CM with respect to the other frames in the new set, and with respect to each incumbent frame included in the stream summary from a prior iteration, wherein the scoring is by:
computing a feature vector for each frame in the set;
computing a non-incumbent coverage score, based on the feature vectors, for each frame in the set with respect to the other frames in the set; and computing a diversity score for each frame in the set with respect to the other frames in the set and with respect to each incumbent frame based on the feature vectors;

selecting frames, from a pool including the non-incumbent and the incumbent frames, based on a solution to an objective function that optimizes the frame scoring for the selection; and updating the stream summary stored in a memory in response to selecting a non-incumbent frame in preference over an incumbent frame.

17. The media of claim 16, further comprising instructions stored thereon, which when executed by the processor, further cause the processor to perform the method further comprising:

updating the stream summary by:
  adding to the stream summary each non-incumbent frame selected;
  adding to the stream summary a coverage score associated with each non-incumbent frame selected; and
selecting one or more frame by:
  computing a coverage vector by joining the non-incumbent coverage scores with the stored coverage scores;
  solving an objective function including the coverage vector and the diversity matrix for an optimization vector having the maximum diversity score and maximum coverage score; and
  selecting the non-incumbent frames and incumbent frames identified by the optimization vector.

18. The media of claim 16, wherein the feature vector is based on histograms of oriented gradient (HOG);
computing the non-incumbent coverage score comprises determining a coverage vector including a maximum value of a similarity metric for each frame in the new set; and
computing the diversity score comprises determining a 2D diversity matrix comprising the distance between color histograms for pairings of all frames in the pool.

19. The media of claim 16, further comprising instructions which when executed cause the system to perform the method further comprising:
storing, to a secondary memory, each frame and associated coverage value removed from a stream summary slot;
performing a secondary selection of frames, from a pool of frames including those associated with the summary frame slots and those stored to the secondary memory, based on a solution to the objective function that optimizes the frame scoring for a predetermined number of slots of a secondary stream summary; and
storing the frames from the secondary selection to the memory.

20. A captured video data stream summarization method, comprising:
receiving a stream of consecutively exposed video data frames from a camera hardware module (CM);
iteratively evaluating a stream summary comprising one or more of the video data frames based on each new set of frames received from the CM, wherein the evaluating further comprises:
scoring each non-incumbent frame in a new set of frames received from the CM with respect to the other frames in the new set, and with respect to each incumbent frame included in the stream summary from a prior iteration;

selecting frames, from a pool including the non-incumbent and the incumbent frames, based on a solution to an objective function that optimizes the frame scoring for the selection; and updating the stream summary stored in a memory in response to selecting a non-incumbent frame in preference over an incumbent frame, wherein updating the stream summary further comprises:
  adding to the stream summary each non-incumbent frame selected;
  adding to the stream summary a coverage score associated with each non-incumbent frame selected;
  dropping from the stream summary one non-selected incumbent frame for each non-incumbent frame selected; and
  dropping from the stream summary a coverage score associated with each non-selected incumbent frame removed from the stream summary.

21. A video data stream capture and summarization system, comprising:
a camera hardware module (CM) to generate a stream of consecutively exposed video data frames;
logic circuitry coupled to the CM to iteratively evaluate a stream summary comprising one or more of the frames based on each new set of frames received from the CM, wherein the logic circuitry further comprises:
frame scoring logic to score each non-incumbent frame in a new set of frames received from the CM with respect to the other frames in the new set, and with respect to each incumbent frame included in the stream summary from a prior iteration;
frame selection logic to select frames, from a pool including the non-incumbent and the incumbent frames, based on a solution to an objective function that optimizes the frame scoring for the selection; and
logic circuitry to update the stream summary stored in a memory in response to selecting a non-incumbent frame in preference over an incumbent frame, wherein the logic circuitry to update the stream summary is to:
  add to the stream summary each non-incumbent frame selected;
  add to the stream summary a coverage score associated with each non-incumbent frame selected;
  drop from the stream summary one non-selected incumbent frame for each non incumbent frame selected; and
  drop from the stream summary a coverage score associated with each non-selected incumbent frame removed from the stream summary.

22. One or more computer-readable storage media, with instructions stored thereon, which when executed by a processor, cause the processor to perform a method comprising:
iteratively evaluating a stream summary comprising one or more video data frames from a stream of consecutively exposed video data frames based on each new set of frames received from the CM, wherein the evaluating further comprises:
scoring each non-incumbent frame in a new set of frames received from the CM with respect to the other frames in the new set, and with respect to each incumbent frame included in the stream summary from a prior iteration;
selecting frames, from a pool including the non-incumbent and the incumbent frames, based on a solution to an objective function that optimizes the frame scoring for the selection; and updating the stream summary stored in a memory in response to selecting a non-incumbent frame in preference over an incumbent frame, wherein updating the stream summary further comprises:
  adding to the stream summary each non-incumbent frame selected;
  adding to the stream summary a coverage score associated with each non-incumbent frame selected;
  dropping from the stream summary one non-selected incumbent frame for each non-incumbent frame selected; and
  dropping from the stream summary a coverage score associated with each non-selected incumbent frame removed from the stream summary.

\* \* \* \* \*